No. 711,754. Patented Oct. 21, 1902.
G. A. BLAKE.
SELF CLOSING FAUCET.
(Application filed Nov. 26, 1901.)
(No Model.)

Witnesses
Fenton S. Belt,
C. W. Clement.

Inventor
G. A. Blake
By Watson & Watson
Attorneys

THE NORRIS PETERS CO., PHOTO-LITHO., WASHINGTON, D. C.

UNITED STATES PATENT OFFICE.

GEORGE A. BLAKE, OF NEW BEDFORD, MASSACHUSETTS.

SELF-CLOSING FAUCET.

SPECIFICATION forming part of Letters Patent No. 711,754, dated October 21, 1902.

Application filed November 26, 1901. Serial No. 83,759. (No model.)

*To all whom it may concern:*

Be it known that I, GEORGE A. BLAKE, a citizen of the United States, residing at New Bedford, in the county of Bristol, State of Massachusetts, have invented certain new and useful Improvements in Self-Closing Faucets, of which the following is a specification.

This invention comprises certain improvements in self-closing faucets of the kind in which the valve is opened against the pressure of the liquid and in closing is retarded by an air-cushion formed between a part connected with the valve and a chamber in the valve-casing.

Figure 1:
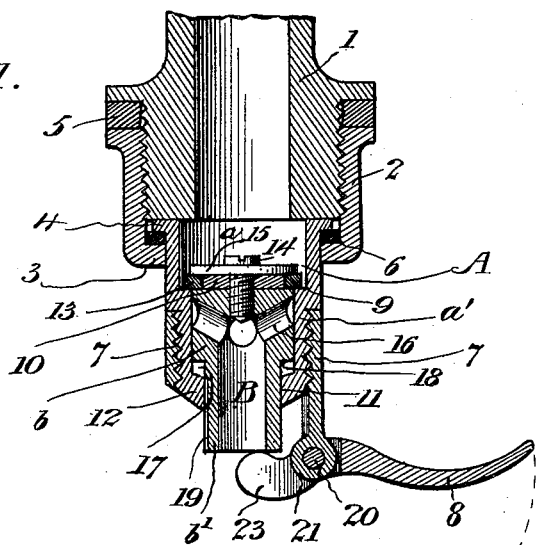
Figure 2:
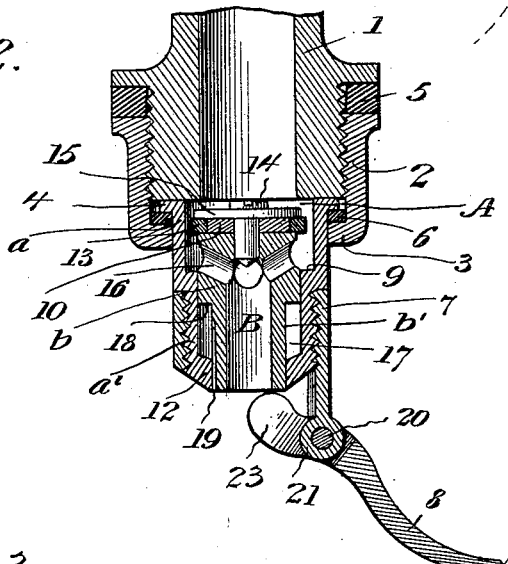
Figure 3:
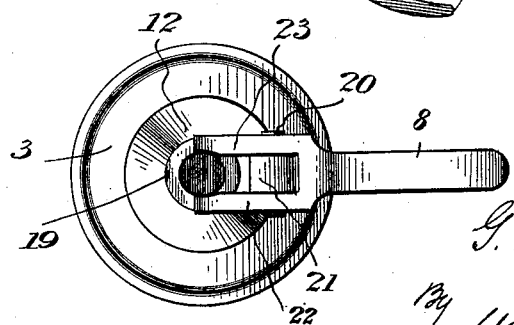

In the accompanying drawings, which illustrate the invention, Figure 1 is a central longitudinal section through the faucet with the valve closed. Fig. 2 is a similar section with the valve open, and Fig. 3 is an end view of the faucet.

Referring to the drawings, 1 indicates the end of a service-pipe, to which the faucet-casing A is connected by a coupling 2, threaded onto the service-pipe and having a flange 3 projecting inwardly over a flange 4 on the casing, forcing the latter against the end of the pipe. Suitable packing-rings 5 and 6 are interposed at the joints between the coupling and the pipe and between the coupling and casing, respectively, to prevent leakage. Threaded onto the outer end of the casing is a collar 7, to which is pivoted a lever 8 for opening the valve. The internal diameter of the inner portion $a$ of the casing is greater than the internal diameter of the outer cylindrical portion $a'$, leaving between said inner and outer portions an annular shoulder 9, which serves as a seat for the valve.

The valve B comprises a hollow piston $b$, closed at its inner end and fitting closely and movable longitudinally within the cylinder $a'$ of the casing, and a tubular stem $b'$ of smaller diameter leading through an opening 11 in the outer end 12 of the casing and fitting closely within said opening. A ring 13, made of leather or rubber, is secured to the closed end or base of the piston by means of a screw 14 and a metal washer 15, between which and said base the ring 13 is clamped, a washer 10 being arranged within the ring to center the latter. The ring 13 projects over the shoulder, as shown, and said parts form a head for the piston, which abuts against the seat or shoulder 9 when the valve is in its closed position. One or more orifices 16 extend from the interior of the piston to its periphery near its inner end. The space 17 surrounding the valve-stem between the end 12 of the casing and the end 18 of the piston forms an air-chamber for cushioning the valve when coming to its seat. A vent to permit the air to escape from the chamber when the valve is closing and through which the air is admitted when the valve is opening is conveniently formed by making a narrow groove 19 in the side of the valve-stem, as shown, or in the side of the opening 11, or by making a small perforation extending through the casing. This vent is sufficiently restricted to prevent the immediate escape of the air from the chamber.

The shorter arm of the lever 8 is forked, as shown, and the two arms 22 and 23 of the fork are pivoted upon the opposite ends of a pin 20, which extends through a projection 21, the latter being formed integral with the collar 7. The two arms of the fork bear against the end of the tubular valve-stem at opposite sides thereof.

In operation when the long arm of the lever is depressed the shorter arm bearing against the end of the valve-stem forces the valve inward against the pressure of the fluid in the service-pipe, lifting the head from its seat and raising the orifices 16 above the inner end of the cylinder, as shown in Fig. 2. The liquid then passes from the service-pipe through the inner part $a$ of the casing, thence through the orifices 16 to the interior of the piston and the tubular valve-stem, from whence it passes out between the forks of the lever. When the pressure of the hand is removed from the lever, the water-pressure forces the valve outward, so that the ends of the orifices 16 are closed by the walls of the cylinder and the movement of the valve is arrested by the head of the piston seating against the valve-seat, as shown in Fig. 1, where it is held by the water-pressure and effectually prevents the escape of liquid. The outer movement of the valve, however, is retarded by the air-cushion sufficiently to prevent the sudden seating of the valve, and the hammer-blow which follows the sudden stoppage of liquids under pressure in pipes is therefore prevented.

Having thus fully described my invention, what I claim, and desire to secure by Letters Patent, is—

1. In a faucet, the combination with a casing having a cylindrical valve-chamber therein, a head at the outer end of the chamber provided with a central opening of less diameter than the diameter of the valve-chamber, and a shoulder surrounding the inner end and forming a valve-seat, of a valve comprising a hollow piston movable longitudinally and fitting closely within the chamber and having an orifice extending from its periphery to its interior, said orifice being normally closed by the wall of the chamber, a head at the inner end of the piston projecting laterally beyond the piston and adapted to fit against the valve-seat, and a tubular valve-stem of less diameter than the piston extending through and fitting closely within the opening in the head of the casing.

2. In a faucet, the combination with a casing having a cylindrical valve-chamber therein, a head at the outer end of the chamber provided with a central opening of less diameter than the diameter of the valve-chamber, and a shoulder surrounding the inner end and forming a valve-seat, of a valve comprising a hollow piston movable longitudinally and fitting closely within the chamber and having an orifice extending from its periphery to its interior, said orifice being normally closed by the wall of the chamber, a head at the inner end of the piston projecting laterally beyond the piston and adapted to fit against the valve-seat, a tubular valve-stem of less diameter than the piston extending through and fitting closely within the opening in the head of the casing, and a handle suitably arranged for forcing the valve inward against the pressure of the fluid.

3. In a faucet, the combination with a casing having a cylindrical valve-chamber therein, a head at the outer end of the chamber provided with a central opening of less diameter than the diameter of the valve-chamber and a shoulder surrounding the inner end and forming a valve-seat, of a valve comprising a hollow piston movable longitudinally and fitting closely within the chamber and having an orifice extending from its periphery to its interior, said orifice being normally closed by the wall of the chamber, a head at the inner end of the piston projecting laterally beyond the piston and adapted to fit against the valve-seat, a tubular valve-stem of less diameter than the piston extending through and fitting closely within the opening in the head of the casing, and a lever pivotally connected with the valve and having forked arms adapted to bear against the end of the valve-stem on opposite sides thereof.

4. In a faucet, the combination with a casing having a cylindrical valve-chamber therein, a head at the outer end of the chamber, and a shoulder surrounding the inner end and forming a valve-seat, of a hollow piston movable longitudinally within the chamber and having a tubular valve-stem at its outer end, of less diameter than the piston, extending through an opening in the head of the casing, whereby an inclosed air-chamber is formed between the piston and the head of the casing, said air-chamber being provided with a vent, and said piston having an orifice extending from its periphery to its interior, and a head at the inner end of the piston adapted to fit against the valve-seat.

5. In a faucet, the combination with a casing having a cylindrical valve-chamber therein, a head at the outer end of the chamber, and a shoulder surrounding the inner end and forming a valve-seat, of a hollow piston movable longitudinally within the chamber and having a tubular valve-stem at its outer end, of less diameter than the piston, extending through an opening in the head of the casing, whereby an inclosed air-chamber is formed between the piston and the head of the casing, said air-chamber being provided with a vent, and said piston having an orifice extending from its periphery to its interior, a head at the inner end of the piston adapted to fit against the valve-seat, and a lever pivotally connected with the valve-casing and adapted to bear against the valve-stem.

In testimony whereof I affix my signature in presence of two witnesses.

GEORGE A. BLAKE.

Witnesses:
FRED F. FRANCIS,
THOMAS W. SPENCER.